United States Patent
Nikazm et al.

(10) Patent No.: US 7,523,321 B2
(45) Date of Patent: Apr. 21, 2009

(54) INFORMATION HANDLING SYSTEM INCLUDING A BATTERY SWITCHING CIRCUIT

(75) Inventors: Ayedin Nikazm, Austin, TX (US); Christopher A. Spencer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 364 days.

(21) Appl. No.: 10/759,639

(22) Filed: Jan. 16, 2004

(65) Prior Publication Data

US 2005/0160300 A1  Jul. 21, 2005

(51) Int. Cl.
*H02J 3/46* (2006.01)
*H02J 1/00* (2006.01)

(52) U.S. Cl. .............. 713/300; 713/310; 713/320; 713/321; 713/322; 713/323; 713/324; 713/330; 713/340; 323/282; 307/80; 307/81

(58) Field of Classification Search ............. 713/300, 713/310, 320–324, 330, 340; 323/282; 307/80, 307/81
See application file for complete search history.

(56) References Cited

U.S. PATENT DOCUMENTS

| | | | | |
|---|---|---|---|---|
| 4,015,420 A | * | 4/1977 | Walker | 368/69 |
| 4,101,787 A | * | 7/1978 | Vail | 307/81 |
| 4,175,846 A | * | 11/1979 | Nozawa et al. | 396/406 |
| 4,297,590 A | * | 10/1981 | Vail | 307/43 |
| 5,270,946 A | * | 12/1993 | Shibasaki et al. | 713/340 |
| 5,316,868 A | | 5/1994 | Dougherty et al. | |
| 5,336,568 A | * | 8/1994 | Andrieu | 429/7 |
| 5,552,643 A | * | 9/1996 | Morgan et al. | 307/81 |
| 5,712,553 A | * | 1/1998 | Hallberg | 307/75 |
| 5,886,561 A | | 3/1999 | Eitan et al. | |
| 6,034,443 A | * | 3/2000 | Oliemuller et al. | 307/70 |
| 6,144,115 A | * | 11/2000 | Massie et al. | 307/80 |
| 6,157,166 A | * | 12/2000 | Odaohhara et al. | 320/121 |
| 6,181,067 B1 | * | 1/2001 | Dalton | 315/86 |
| 6,262,562 B1 | * | 7/2001 | Cummings et al. | 320/116 |
| 6,509,717 B2 | * | 1/2003 | Lee | 320/116 |
| 6,522,190 B1 | * | 2/2003 | Malik et al. | 327/408 |
| 6,586,850 B1 | * | 7/2003 | Powers | 307/85 |
| 6,624,535 B2 | * | 9/2003 | Morrow | 307/71 |
| 7,003,679 B1 | * | 2/2006 | Lesea et al. | 713/300 |
| 7,009,363 B2 | * | 3/2006 | Beals et al. | 320/117 |
| 7,009,364 B2 | * | 3/2006 | Stanesti et al. | 320/135 |
| 2005/0037241 A1 | * | 2/2005 | Schneider et al. | 429/9 |

OTHER PUBLICATIONS

Thompson, Ed, *Smart Batteries to the Rescue.*

* cited by examiner

*Primary Examiner*—Abdelmoniem Elamin
(74) *Attorney, Agent, or Firm*—Haynes and Boone, LLP

(57) ABSTRACT

An information handling system (IHS) includes a system board including a processor, a first battery for supplying power to the system board, a second battery for supplying power to the system board, and a switching circuit. The switching circuit is configured to repeatedly switch between the first battery and the second battery for supplying power to the system board to provide more power to the IHS than is possible if only one battery were continuously providing power to the IHS.

20 Claims, 4 Drawing Sheets

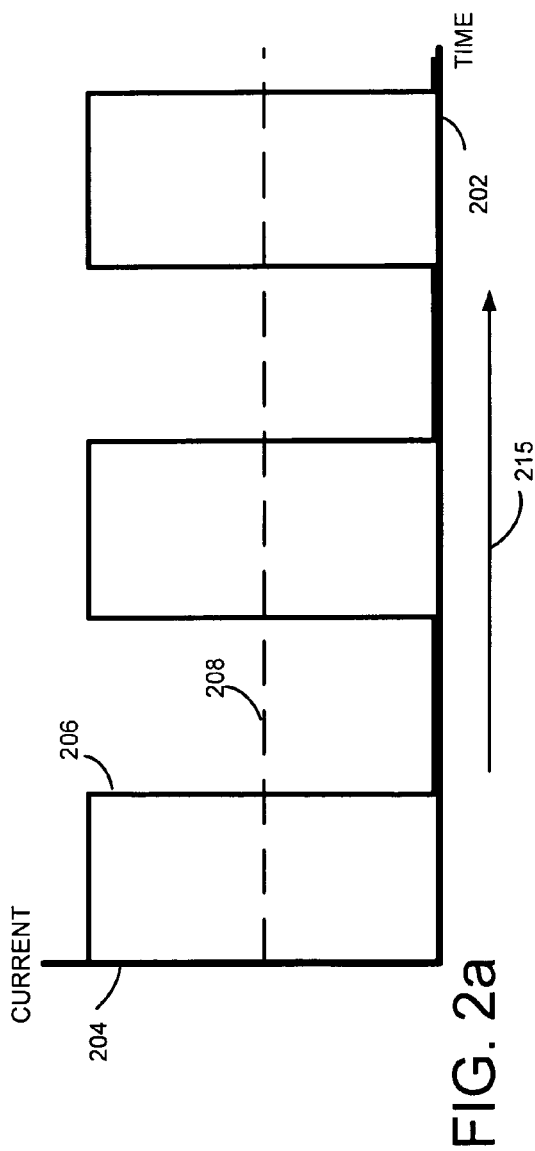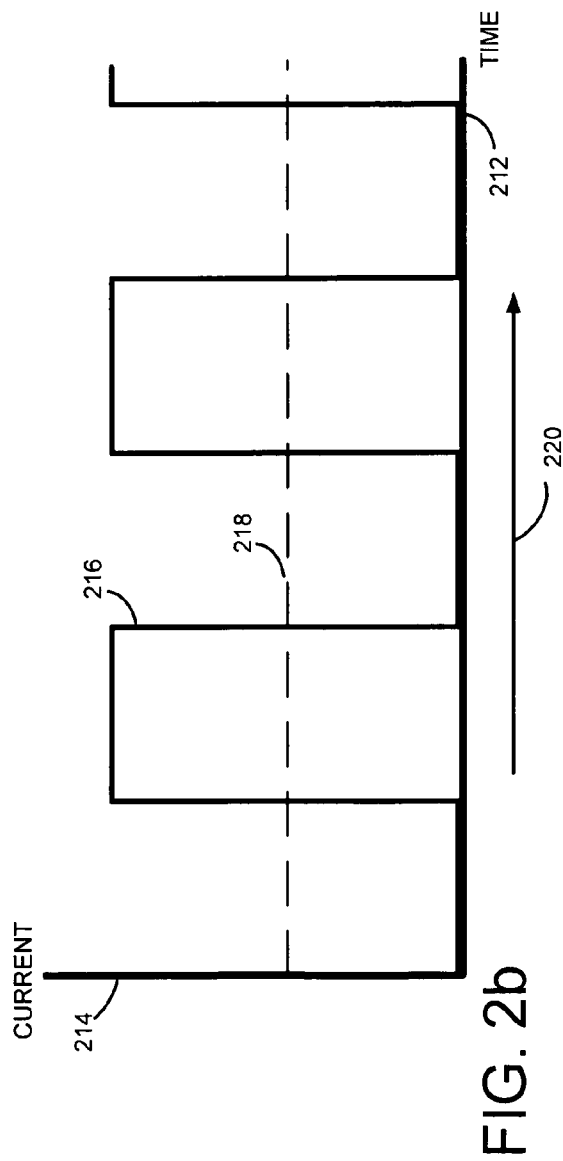

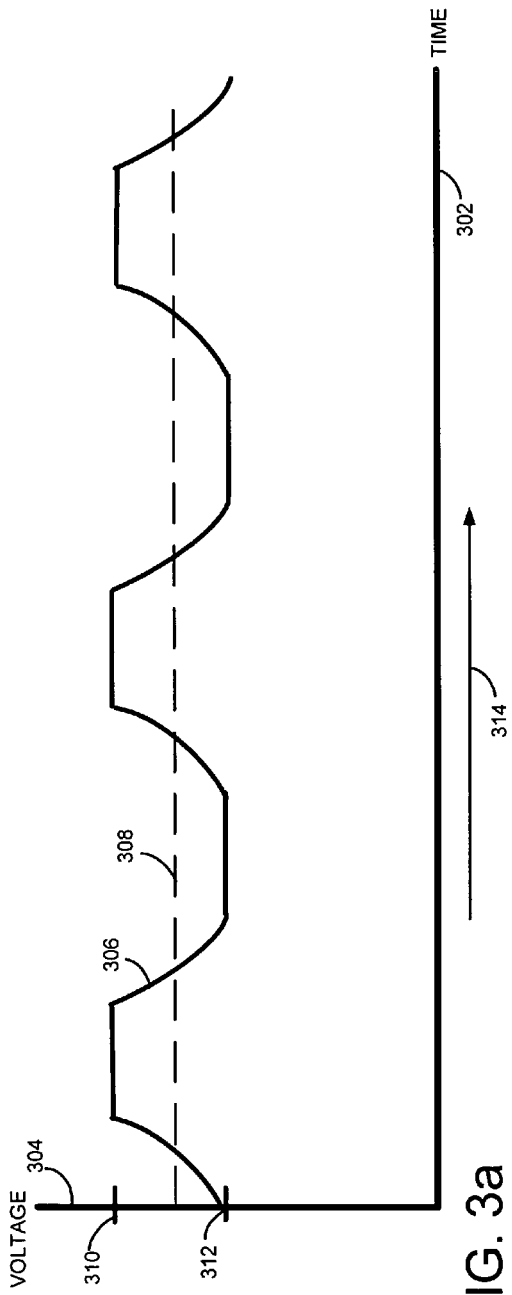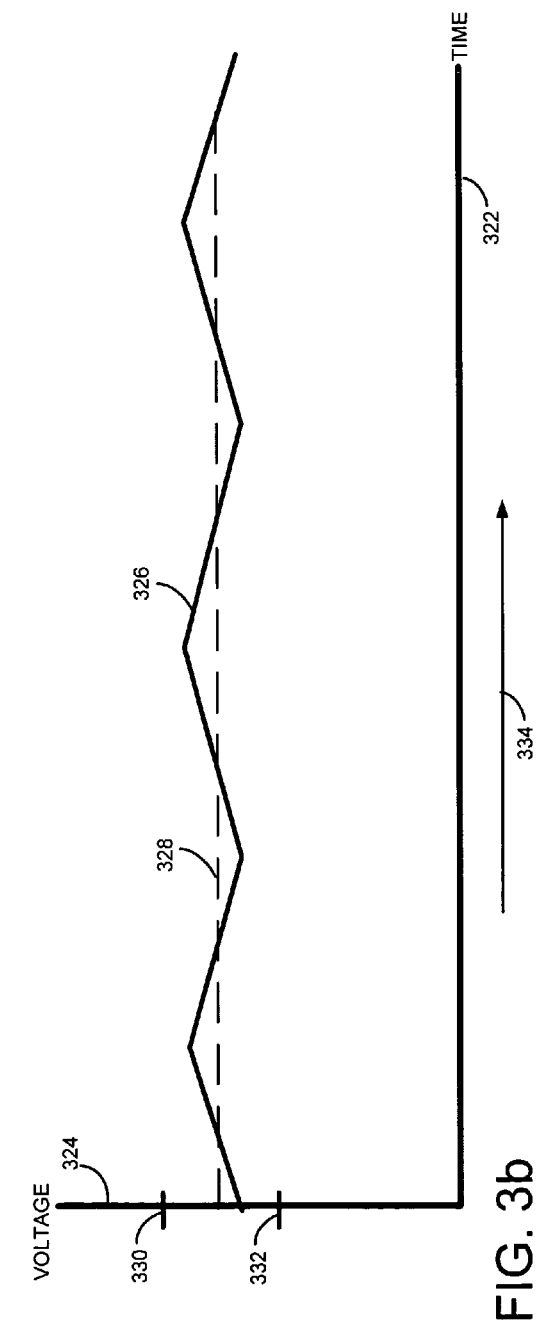

INFORMATION HANDLING SYSTEM INCLUDING A BATTERY SWITCHING CIRCUIT

BACKGROUND

The present disclosure relates generally to information handling systems, and more particularly to information handling systems which feature multiple batteries.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

While information handling systems have become more advanced, further improvements are still desirable. One such area for improvement concerns performance of information handling systems while running on battery power. Battery powered information handling systems that execute advanced software often require a greater amount of power than a single battery can provide to perform at a desired level. There are known information handling systems which include more than one battery. However, existing information handling systems do not fully address the issues related to performance because two batteries are not discharged and utilized together in a consistent and reliable manner.

Accordingly, what is needed is an information handling system that more effectively draws power from multiple batteries.

SUMMARY

According to one embodiment, an information handling system (IHS) is disclosed which includes a system board including a processor, a first battery for supplying power to the system board, a second battery for supplying power to the system board, and a switching circuit. The switching circuit is configured to repeatedly switch between the first battery and the second battery for supplying power to the system board.

A principal advantage of this embodiment is that multiple batteries included in the IHS are utilized and discharged together, resulting in significant performance gains.

BRIEF DESCRIPTION OF THE DRAWINGS

FIG. 2a is a current vs. time graph illustrating the amount of current supplied over time by battery 215 of FIG. 1.

FIG. 2b is a current vs. time graph illustrating the amount of current supplied over time by battery 220 of FIG. 1.

FIG. 3a is a voltage vs. time graph illustrating the switching circuit 210's effect on level of voltage supplied to system board 200 of FIG. 1.

FIG. 3b is a voltage vs. time graph illustrating the effect of capacitor 235 on the level of voltage supplied to system board 200 of FIG. 1.

DETAILED DESCRIPTION

For purposes of this disclosure, an information handling system (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, and one or more network ports for communicating with external devices as well as various input and output (I/O) devices, such as a keyboard, a mouse, and a video display. The information handling system may also include one or more buses operable to transmit communications between the various hardware components.

Figure 1:
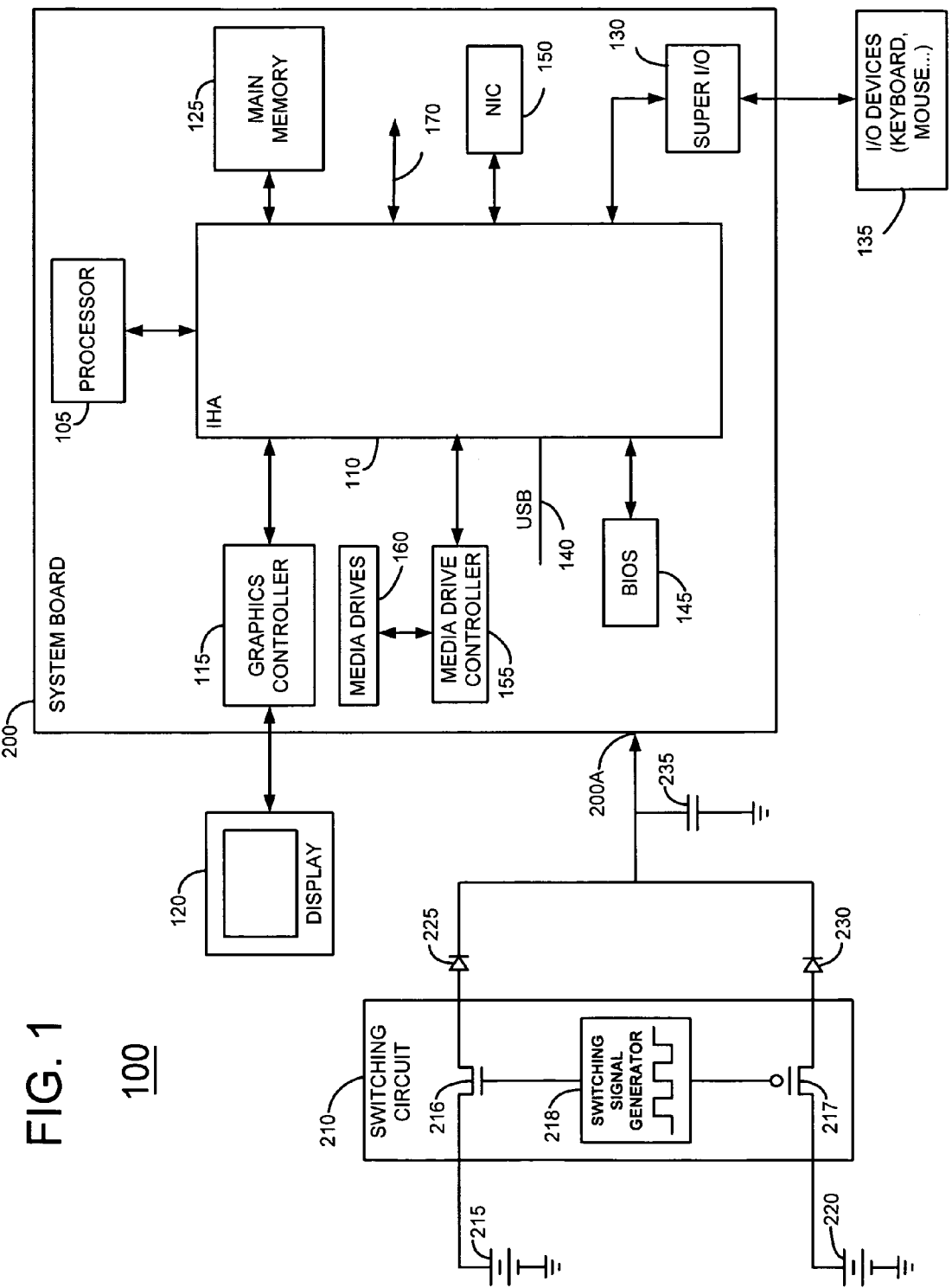
FIG. 1 is a block diagram of an embodiment of the disclosed information handling system.

In one embodiment, an information handling system 100, FIG. 1, includes system board 200. System board 200 includes a processor 105 such as an Intel Pentium series processor or one of many other processors currently available. An Intel Hub Architecture (IHA) chipset 110 provides IHS 100 with graphics/memory controller hub functions and I/O functions. More specifically, IHA chipset 110 acts as a host controller which communicates with a graphics controller 115 coupled thereto. A display 120 is coupled to graphics controller 115. Chipset 110 further acts as a controller for main memory 125 which is coupled thereto. Chipset 110 also acts as an I/O controller hub (ICH) which performs I/O functions. A super input/output (I/O) controller 130 is coupled to chipset 110 to provide communications between chipset 110 and input devices 135 such as a mouse, keyboard, and tablet, for example. A universal serial bus (USB) 140 is coupled to chipset 110 to facilitate the connection of peripheral devices to system 100. System basic input-output system (BIOS) 145 is coupled to chipset 110 as shown. BIOS 145 is stored in CMOS or FLASH memory so that it is nonvolatile.

A local area network (LAN) controller 150, alternatively called a network interface controller (NIC), is coupled to chipset 110 to facilitate connection of system 100 to other information handling systems. Media drive controller 155 is coupled to chipset 110 so that devices such as media drives 160 can be connected to chipset 110 and processor 105. Devices that can be coupled to media drive controller 155 include CD-ROM drives, DVD drives, hard disk drives and other fixed or removable media drives. An expansion bus 170, such as a peripheral component interconnect (PCI) bus, PCI express bus, serial advanced technology attachment (SATA) bus or other bus is coupled to chipset 110 as shown. Expansion bus 170 includes one or more expansion slots (not shown) for receiving expansion cards which provide IHS 100 with additional functionality.

In addition, IHS 100 also includes a battery 215 and a battery 220, both configured to provide power to system board 200 and components thereon. As discussed above, IHS's using existing techniques do not fully utilize the potential for increased performance afforded by multiple batteries. In order to attain increased effective performance from battery 215 and battery 220, IHS 100 includes battery switching circuitry which enables IHS 100 to be alternately powered by a first battery and a second battery. By alternating the power draw between battery 215 and battery 220 over time, the IHS can effectively pull more instantaneous or peak power from each battery during those times when such battery is supplying power than would be possible if only one battery were continuously supplying power to the IHS.

More particularly, IHS 100 includes a switching circuit 210 coupled to battery 215, battery 220 and main power input 200A of system board 200. As discussed in more detail below, a function of switching circuit 210 is to repeatedly switch main power input 200A of system board 200 between battery 215 and battery 220. To achieve this end, switching circuit 210 includes switching transistors 216 and 217 connected as shown. Switching transistor 216 is series coupled between battery 215 and main power input 200A via diode 225. Switching transistor 217 is series coupled between battery 220 and main power input 200A via diode 230. The respective gates of switching transistors 216 and 217 are coupled to switching signal generator 218. Switching signal generator 218 generates a switching signal which alternately turns switching transistor 216 on while switching transistor 217 is off and turns switching transistor 217 on while switching transistor 216 is off. In one embodiment, the switching rate of the switching signal generated by switching circuit 218 is a rate within the range of approximately 100 KHz to approximately 500 KHz, although different switching rates are suitable in other embodiments.

Diode 225 and diode 230 prevent reverse current flow from battery 215 to battery 220 and vice versa. IHS 100 further includes a capacitor 235 to smooth out possible voltage variance caused by repeatedly switching between battery 215 and battery 220. Capacitor 235 is discussed in more detail elsewhere herein (in connection with FIGS. 3a and 3b).

Typically, a battery is discharged under a continuous load. For example, in a single battery IHS, the single battery continuously supplies the power required by the IHS. Even in existing IHS's with more than one battery, the discharging techniques are similar. Typically, one battery is discharged under a continuous load until exhaustion, at which point another battery takes its place as the source of power. Where a battery is discharged under a continuous load, the amount of current ("continuous load current") that may be drawn from the battery at a given point in time must be sufficiently limited so that the battery does not become unstable from the continuous load. Drawing more current than can be handled by the battery may cause the battery to overheat. In contrast, it was found that for brief periods of time of discharge, a battery is capable of supplying, without becoming unstable, a greater amount of current than can be supplied under a continuous load. Such an amount of current is referred to as "peak current." Moreover, the amount of power associated with "peak current" is referred to as "peak power."

In IHS 100, battery 215 and battery 220 are each configured to supply peak current and accordingly, peak power, to system board 200. This configuration is facilitated by switching circuit 210 which repeatedly switches between battery 215 and battery 220 for supplying current and power to system board 200. Repeatedly switching the source of current allows each of batteries 215 and 220, when connected to supply power to system board 200, to supply current for brief periods of time. Accordingly, switching circuit 210 allows battery 215 to supply "peak current" while battery 220 cools off and vice versa. The switching rate of switching signal generator 218 is selected to allow sufficient time for one battery to cool while the other battery is supplying power.

For explanatory purposes, in the following discussion in connection with FIGS. 2a-c, X refers to the amount of continuous load current supplied by each of batteries 215 and 220. In the illustrative embodiment, the amount of peak current supplied by each of batteries 215 and 220 is approximately double the amount of continuous load current. Accordingly, in the following discussion, 2X refers to the amount of peak current supplied by each of batteries 215 and 220.

Figure 2C:
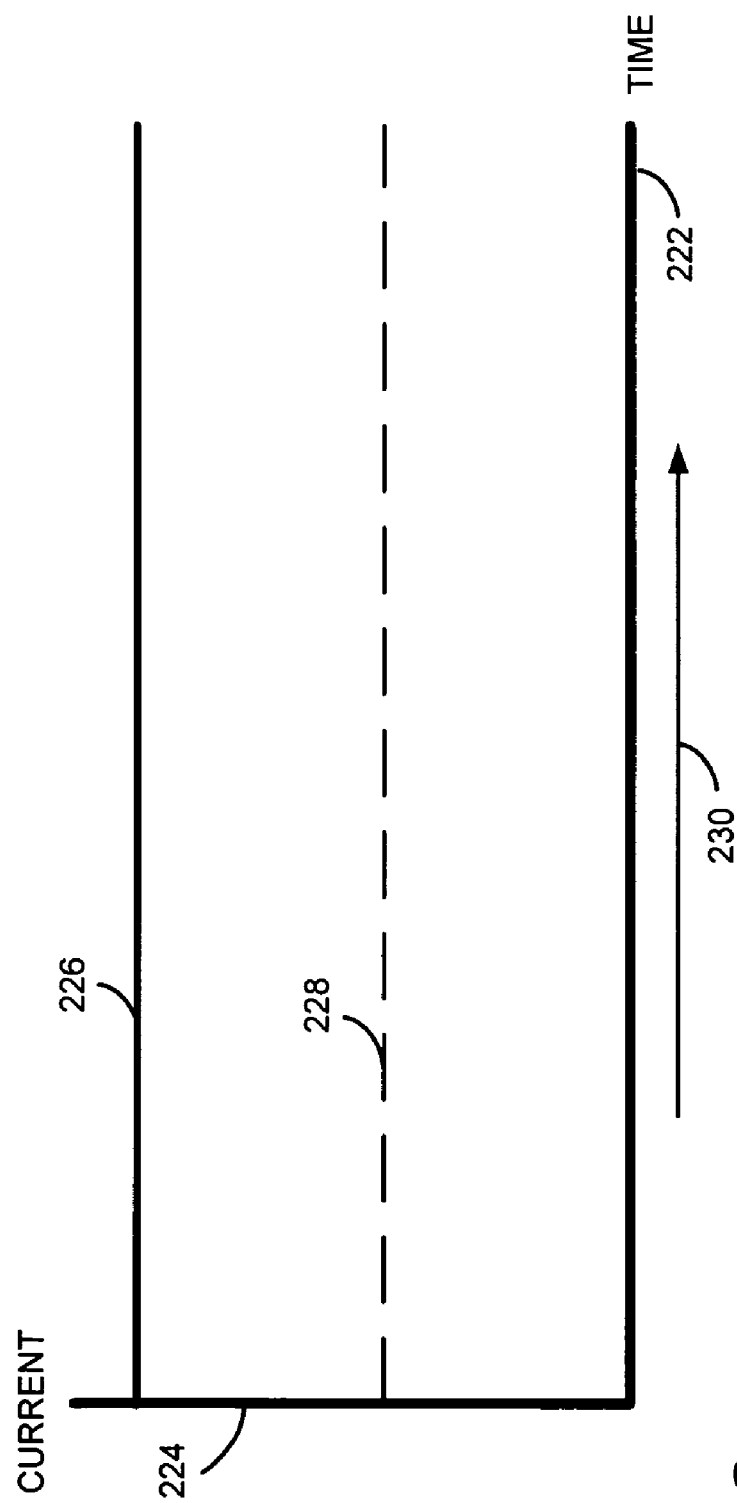
FIG. 2c is a current vs. time graph illustrating the aggregate amount of current supplied over time by both batteries 215 and 220 of FIG. 1.

FIGS. 2a-c are current vs. time graphs, collectively illustrating the amount of current supplied over time by batteries 215 and 220 of IHS 100. More specifically, FIG. 2a shows the amount of current supplied over time by battery 215 of FIG. 1. In FIG. 2a, the amount of current supplied is represented by a current axis 204, and the passage of time is represented by a time axis 202. A solid line 206 represents the amount of peak current (measured along current axis 204) supplied by battery 215 as time (measured along time axis 202) moves in the direction indicated by an arrow 210. For reference, a dashed line 208 represents the amount of continuous load current (measured along current axis 204) supplied by battery 215 as time progresses.

As indicated by dashed line 208, at all given points in time indicated in FIG. 2a, battery 215 supplies X amount of current under a continuous load. However, as indicated by solid line 206, battery 215 supplies 2X amount of current for some periods of time but supplies no (0) amount of current for other periods of time. The periods of time during which battery 215 supplies 2X amount of current represents the periods of time during which switching circuit 210, depicted in FIG. 1, has connected battery 215 for supplying power to system board 200. Accordingly, the periods of time during which battery 215 supplies no current represents the periods of time during which switching circuit 210 has connected another battery (i.e. battery 220) for supplying power to system board 200.

FIG. 2b is a current vs. time graph illustrating the amount of current supplied over time by battery 220 of FIG. 1. In FIG. 2b, the amount of current supplied is represented by a current axis 214, and the passage of time is represented by a time axis 212. A solid line 216 represents the amount of peak current (measured along current axis 214) supplied by battery 220 as time (measured along time axis 212) moves in the direction indicated by an arrow 220. For reference, a dashed line 218 represents the continuous load current (measured along current axis 214) supplied by battery 215 as time progresses.

As indicated by dashed line 218, at all given points in time shown in FIG. 2b, battery 220 supplies X amount of current under a continuous load. However, as indicated by solid line 216, battery 220 supplies 2X amount of current for some periods of time and supplies no (0 amount) current for other periods of time. The periods of time during which battery 220 supplies 2X amount of current represents the periods of time during which switching circuit 210 depicted in FIG. 1, has connected battery 220 for supplying power to system board 200. Accordingly, the periods of time during which battery 220 supplies no current represents the periods of time during which switching circuit 210 has connected another battery (i.e. battery 215) for supplying power to system board 200.

Referring now simultaneously to FIG. 2a and FIG. 2b, it can be seen that during the periods where battery 215 supplies current, battery 220 supplies no current, and vice versa.

FIG. 2c is a current vs. time graph illustrating the aggregate amount of current supplied over time by both batteries 215 and 220. In FIG. 2c, the amount of current supplied is represented by a current axis 224, and the passage of time is represented by a time axis 222. A solid line 226 represents the amount of current (measured along current axis 224) supplied by both batteries 215 and 220 as time (measured along time axis 222) moves in the direction indicated by an arrow 230. For reference, a dashed line 228 represents the continuous load current (measured along current axis 214) supplied by battery 215 or 220 as time moves in the direction indicated by arrow 220. Still for reference, dashed line 228 also represents the amount of current supplied by batteries 215 and 220 in an IHS utilizing existing techniques.

As indicated by dashed line 228, at all given points in time shown in FIG. 2c, multiple batteries (such as batteries 215 and 220) in an existing IHS, supplies X amount of current. However, as indicated by solid line 226, batteries 215 and 220 in the illustrative embodiment are discharged together and accordingly supplies approximately 2X amount of current at all given moments of time shown in FIG. 2c. Accordingly, in the illustrative embodiment, the amount of power supplied to system board 200 is also approximately twice the amount of power supplied using existing techniques.

FIGS. 3a and 3b are voltage vs. time graphs illustrating the level of voltage supplied to system board 200 over time by batteries 215 and 220. For explanatory purposes, batteries 215 and 220 each supply different levels of voltage. Accordingly, in such a case, repeatedly switching between battery 215 and battery 220 for supplying current and power to system board 200 causes fluctuations in the level of voltage supplied to system board 200.

In more detail, FIG. 3a is a voltage vs. time graph illustrating switching circuit 210's effect on the voltage level supplied to system board 200. In FIG. 3a, the level of voltage supplied is represented by a voltage axis 304, and the passage of time is represented by a time axis 302. A solid line 306 represents the voltage level (measured along voltage axis 306) supplied by batteries 215 and 220 as time (measured along time axis 302) moves in the direction indicated by an arrow 314. The voltage level supplied by battery 215 is represented by a mark 310 and the voltage level supplied by battery 220 is represented by a mark 312 as shown on voltage axis 304 in FIG. 3a. As depicted by solid line 306, the voltage level supplied by batteries 215 and 220 fluctuates, undesirably, between voltage levels represented by marks 310 and 312. Accordingly, IHS 100 includes a capacitor 235 for stabilizing the voltage level supplied to system board 200 by reducing the fluctuation in the voltage level supplied to system board 200. For reference, a dashed line 308 represents the voltage level supplied by batteries 215 and 220 as time moves along time axis 302 in the direction indicated by arrow 314, if there were no fluctuation in voltage (i.e. the voltage level supplied at a given point in time is the average of the levels of voltage supplied by batteries 215 and 220).

FIG. 3b is a voltage vs. time graph illustrating the effect of capacitor 235 on the level of voltage supplied to system board 200 in IHS 100. Similar to FIG. 3a, in FIG. 3b, the voltage level supplied is represented by a voltage axis 324, and the passage of time is represented by a time axis 322. A solid line 326 represents the voltage level (measured along voltage axis 324) supplied by batteries 215 and 220 as time (measured along time axis 322) moves in the direction indicated by an arrow 334. The voltage level supplied by battery 215 is represented by a mark 330 and the voltage level supplied by battery 220 is represented by a mark 332 as shown on voltage axis 324 in FIG. 3a. For reference, a dashed line 328 represents the voltage level supplied by batteries 215 and 220 as time moves along time axis 322 in the direction indicated by arrow 334, if there were no fluctuation in the voltage level supplied (i.e. the voltage level supplied at a given point in time is the average of the levels of voltage supplied by batteries 215 and 220). As depicted by solid line 326, in comparison to the voltage level fluctuation represented by line 306 of FIG. 3a, the fluctuation in the voltage level supplied by batteries 215 and 220 is reduced or smoothed by capacitor 235.

Referring again to FIG. 1, switching circuit 210 and the functions it performs as discussed hereinabove, may be implemented using a number of different techniques. In one embodiment, switching circuit 210 includes a transistor-switching implementation using field effect transistor (FET) switches as switches 216 and 217. In one version of such embodiment, IHS 100 employs a clocked source such as a Flip-Flop for switching signal generator 218 to provide variable switching frequency to affect the rate at which switching circuit 210 performs the switching function.

Although illustrative embodiments have been shown and described, a wide range of modification, change and substitution is contemplated in the foregoing disclosure and in some instances, some features of the embodiments may be employed without a corresponding use of other features. For example, in the illustrative embodiment, switching circuit 210 switches between batteries 215 and 220, and each of the batteries is connected to supply power to system board 200 for equal periods of time. However, in another embodiment, switching circuit 210 connects battery 215 to supply power to system board 200 for periods of time greater than the periods of time for which battery 220 is connected to supply power to system board 200. In yet another embodiment, switching circuit 210 connects battery 220 to supply power to system board 200 for periods of time greater than the periods of time for which battery 215 is connected to supply power to system board 200. Accordingly, it is appropriate that the appended claims be construed broadly and in a manner consistent with the scope of the embodiments disclosed herein.

What is claimed is:

1. An information handling system (IHS) comprising:
a system board including a processor;
a first battery for supplying power to the system board;
a second battery for supplying power to the system board; and
a switching circuit coupled to the first battery, the second battery and the system board, for repeatedly switching between the first battery and the second battery for supplying power to the system board, the switching circuit receiving only one input from the first battery and only one input from the second battery, each battery supplying a peak amount of current for periods of time during which the switching circuit has connected one of the batteries for supplying current while, in the aggregate, the batteries maintain a continuous supply of peak current to the system;
a first diode coupled in series with the first battery, the switching circuit, and the system board, wherein the first diode is located between the switching circuit and the system board, and wherein the first diode prevents reverse flow current from the second battery to the first battery while the second battery is supplying power to the system board; and
a second diode coupled in series with the second battery, the switching circuit, and the system board, wherein the second diode is located between the switching circuit and the system board, and wherein the second diode prevents reverse flow current from the first battery to the second battery while the first battery is supplying power to the system board;

wherein at no time during operation are both the first and second batteries connected for supplying current;

wherein the switching circuit connects the first battery to supply power to the system board during first periods of time alternating with second periods of time during which the switching circuit connects the second battery to supply power to the system board; and wherein the first time periods are equal in duration to the second time periods.

2. The IHS of claim 1, wherein the peak power that can be drawn from the first battery during the first time periods is greater than the power that the first battery is capable of supplying under a continuous load.

3. The IHS of claim 1, wherein the peak power that can be drawn from the second battery during the second time periods is greater than the power that the second battery is capable of supplying under a continuous load.

4. The IHS of claim 1, wherein the first time periods are greater in duration than the second time periods.

5. The IHS of claim 1, wherein the first time periods are shorter in duration than the second time periods.

6. The IHS of claim 1, wherein the switching circuit includes a field effect transistor (FET) switch.

7. The IHS of claim 6, wherein the FET switch operates in response to a switching signal generator.

8. The IHS of claim 7, wherein the switching signal generator exhibits a variable switching frequency.

9. The IHS of claim 1, further comprising a capacitor coupled to the switching circuit, wherein the capacitor is for stabilizing the voltage supplied to the system board.

10. The IHS of claim 1 wherein the IHS is a portable IHS.

11. A method of operating an information handling system (IHS) comprising:

supplying power from first and second batteries to a battery switching circuit; and repeatedly switching, by the battery switching circuit, between a first battery and a second battery for supplying power to the IHS, the battery switching circuit receiving only one input from the first battery and only one input from the second battery, each battery supplying a peak amount of current for periods of time during which the switching circuit has connected one of the batteries for supplying current while, simultaneously, the other of the batteries supplies no current whereby, in the aggregate, the batteries maintain a continuous supply of peak current to the system;

wherein at no time during operation are both the first and second batteries connected for supplying current;

wherein a first diode is coupled in series with the first battery, the switching circuit and the IHS, wherein the first diode is located between the switching circuit and the IHS, and wherein the first diode prevents reverse flow current from the second battery to the first battery while the second battery is supplying power to the system board;

wherein a second diode is coupled in series with the second battery, the switching circuit, and the IHS, wherein the second diode is located between the switching circuit and the IHS, and wherein the second diode prevents reverse flow current from the first battery to the second battery while the first battery is supplying power to the system board; and wherein the switching circuit connects the first battery to supply power to the system board during first periods of time alternating with second periods of time during which the switching circuit connects the second battery to supply power to the system board, and wherein the first time periods are equal in duration to the second time periods.

12. The method of claim 11, wherein the peak power that can be drawn from the first battery during the first time periods is greater than the power that the first battery is capable of supplying under a continuous load.

13. The method of claim 11, wherein the peak power that can be drawn from the second battery during the second time periods is greater than the power that the second battery is capable of supplying under a continuous load.

14. The method of claim 11, wherein the first time periods are greater in duration than the second time periods.

15. The method of claim 11, wherein the first time periods are shorter in duration than the second time periods.

16. The method of claim 11, wherein the switching circuit includes a field effect transistor (FET) switch.

17. The method of claim 16, wherein the FET switch operates in response to a switching signal generator.

18. The method of claim 17, wherein the switching signal generator exhibits a variable switching frequency.

19. The method of claim 11, further comprising stabilizing, by a capacitor, the voltage supplied to the system board.

20. A method of operating an information handling system (IHS) comprising:

providing a system board including a processor;

supplying power to the system board by means of a first battery and a second battery;

coupling a switching circuit to the first battery, the second battery and the system board; and repeatedly switching, by the battery switching circuit, between the first battery and the second battery for supplying power to the IHS, the switching circuit receiving only one input from the first battery and only one input from the second battery, each battery supplying a peak amount of current for periods of time during which the switching circuit has connected one of the batteries for supplying current while, simultaneously, the other of the batteries supplies no current whereby, in the aggregate, the batteries maintain a continuous supply of peak current to the system;

wherein at no time during operation are both the first and second batteries connected for supplying current;

wherein a first diode is coupled in series with the first battery, the switching circuit, and the system board, wherein the first diode is located between the switching circuit and the system board, and wherein the first diode prevents reverse flow current from the second battery to the first battery while the second battery is supplying power to the system board;

wherein a second diode is coupled in series with the second battery, the switching circuit, and the system board, wherein the second diode is located between the switching circuit and the system board, and wherein the second diode prevents reverse flow current from the first battery to the second battery while the first battery is supplying power to the system board; and wherein the switching circuit connects the first battery to supply power to the system board during first periods of time alternating with second periods of time during which the switching circuit connects the second battery to supply power to the system board, and wherein the first time periods are equal in duration to the second time periods.

* * * * *

UNITED STATES PATENT AND TRADEMARK OFFICE
CERTIFICATE OF CORRECTION

PATENT NO. : 7,523,321 B2
APPLICATION NO. : 10/759639
DATED : April 21, 2009
INVENTOR(S) : Ayedin Nikazm et al.

Page 1 of 1

It is certified that error appears in the above-identified patent and that said Letters Patent is hereby corrected as shown below:

Col. 6;
Claim 1, Line 47 delete "and".

Signed and Sealed this

Twenty-ninth Day of December, 2009

David J. Kappos
*Director of the United States Patent and Trademark Office*